United States Patent Office 3,836,471
Patented Sept. 17, 1974

3,836,471
LUBRICANTS AND FUELS CONTAINING ESTER-CONTAINING COMPOSITIONS
Clark Ober Miller, Willoughby Hills, Ohio, assignor to The Lubrizol Corporation, Wickliffe, Ohio
No Drawing. Continuation-in-part of application Ser. No. 360,207, May 14, 1973, which is a continuation of application Ser. No. 152,424, June 11, 1971, now abandoned, which is a division of application Ser. No. 12,838, Feb. 19, 1970, now abandoned, which in turn is a continuation-in-part of application Ser. No. 823,990, May 12, 1969, now abandoned. This application June 12, 1973, Ser. No. 369,384
Int. Cl. C10m 1/34, 1/36
U.S. Cl. 252—51.5 A                                16 Claims

ABSTRACT OF THE DISCLOSURE

Ester-containing compositions prepared by reacting a high molecular weight carboxylic acid acylating agent with polyoxyalkylene alcohol demulsifiers for aqueous emulsions. The ester-containing compositions are useful as additives in normally liquid fuels and lubricants.

---

This is a continuation-in-part of my copending application Ser. No. 360,207, filed May 14, 1973, which was a continuation of my copending application Ser. No. 152,424, filed June 11, 1971, now abandoned.

This was a divisional application of my application Ser. No. 12,838, filed Feb. 19, 1970, now abandoned, which, in turn is a continuation-in-part application of my earlier application Ser. No. 823,990, filed May 12, 1969, now abandoned.

This invention relates to novel compositions of matter, processes for their preparation, and to lubricants and fuels containing these novel compositions. Particularly, this invention is broadly concerned with compositions produced by reacting certain carboxylic acid acylating agents with (1) polyoxyalkylene alcohols, or (2) polyoxyalkylene alcohols and one or more polyhydric alcohols, amines, or basically reacting alkaline earth metal compounds.

It is now well-known that esters and acylated amines prepared by reacting high molecular weight mono- or poly-carboxylic acids with alcohols and amines are useful as additives in lubricants and fuels where they function as dispersants or detergents and otherwise promote engine cleanliness. The state of the art with respect to these additives is represented by U.S. Pats. 3,163,603 (reissued as 26,433); 3,172,892; 3,184,474; 3,219,666; 3,272,746; 3,307,928; 3,331,776; 3,341,542; 3,346,354; and 3,381,022.

While these materials have achieved widespread commercial acceptance as additives for lubricants and fuels, their use has not been entirely without some problems and there is a continuing effort to improve their performance. For example, it is reported in U.S. Pat. 3,347,645 that acylated nitrogen compositions prepared by reacting alkenyl-substituted succinic anhydrides with polyamines function effectively as dispersants in gasoline but promote aqueous emulsion in the gasoline during storage and shipment. Furthermore, the presence of these new dispersants sometimes promotes the formation of an aqueous emulsions on internal engine surfaces where water vapors can condense in the presence of oil such as on rocker arm covers and oil-fill caps. The use of these new dispersants in lubricants has sometimes been accompanied by rust problems.

According to the present invention, there is provided a novel class of dispersants having improved characteristics with regard to varnish reduction, dispersancy, as well as the aqueous emulsion and rust problems. These novel compositions can be used as lubricant and fuel additives in the same manner as the prior art dispersants disclosed in the above-listed U.S. patents.

In accordance with the foregoing, it is a principal object of this invention to provide novel compositions of matter. Another object is to provide novel compositions of matter useful as additives in lubricants and fuels. A further object is to provide novel compositions of matter useful as detergents and dispersants in lubricants and fuels. A still further object is to provide lubricants and fuels containing as detergent and dispersant additives the novel compositions of this invention. An additional object is to provide processes for preparing these novel compositions.

These as well as other objects of this invention can be achieved by providing a process for preparing ester-containing compositions comprising the steps of reacting under esterification conditions (A) at least one carboxylic acid acylating agent having an average of at least thirty aliphatic carbon atoms per molecule exclusive of carboxyl carbon atoms with (B) at least one polyoxyalkylene alcohol demulsifier for aqueous emulsions, the total amount of (A) and (B) used in the reaction being such that there is about 0.001 equivalent of (B) for each equivalent (A). Another aspect of the invention can be achieved by the additional step of contacting (C) at least one member selected from the group consisting of polyhydric alcohols, amines, and basically reacting alkaline earth metal compounds with the ester-containing composition, the total amount of (C) being such that there is at least about 0.01 equivalent of (C) for each equivalent of (A). A further embodiment of the invention can be achieved by providing a process wherein (A) is reacted with (B) and at least one member selected from the group consisting of (C) polyhydric alcohols, amines, and basically reacting alkaline earth metal compounds, the total amount of (C) being such that there is at least 0.01 equivalent of (C) for each equivalent of (A). The novel compositions contemplated by the present invention are those produced in accordance with these processes while lubricants and fuels contemplated are readily achieved by incorporating these compositions into lubricating oils, greases, or other lubricants or into a normally liquid fuel such as a petroleum distillate fuel, e.g., kerosene, diesel fuel, fuel oil, gasolines, jet aviation fuel, and the like.

The carboxylic acid acylating agents, (A) above, is the carboxylic acid per se or an acylating agent derived from a mono- or polycarboxylic acid. An important characteristic of the acylating agent is its size. It should contain at least thirty, preferably at least about fifty, aliphatic carbon atoms exclusive of the carboxyl carbon atoms. This limitation is based upon both oil-solubility considerations and the effectiveness of the compositions as additives in lubricants and fuels. Another important aspect of the acylating agent is that it preferably should be substantially saturated, i.e., at least about 95% of the total number of the carbon-to-carbon covalent linkages therein preferably should be saturated linkages. In an especially preferred aspect of the invention, at least about 98% of these covalent linkages are saturated. Obviously, all of the covalent linkages may be saturated. A greater degree of unsaturation renders the esters more susceptible to oxidation, degradation, and polymerization and this lessens the effectiveness of the final products as lubricant and fuel additives. In addition, the acylating agent should be substantially free from oil-solubilizing pendant groups, that is, groups having more than about six aliphatic carbon atoms. Although, some such oil-solubilizing pendant groups may be present, they preferably will not exceed one such group for every twenty-five aliphatic carbon atoms in the principal hydrocarbon chain.

The acylating agent may contain polar substituents provided that the polar substituents are not present in proportions sufficiently large to alter significantly the hydrocarbon character of the radical. Typical suitable polar substituents are halo, such as chloro and bromo, oxo, oxy, formyl, sulfonyl, sulfinyl, thio, nitro, etc. Such polar substituents, if present, preferably will not exceed 10% by weight of the total weight of the hydrocarbon portion of the carboxylic acid radical exclusive of the carboxyl group. The carboxylic acid acylating agents also may contain cyclic and/or aromatic groups. However, they should be essentially aliphatic in nature. The preferred acylating agents are aliphatic mono- and polycarboxylic acids, anhydrides, or mixtures thereof.

Carboxylic acid acylating agents suitable for preparing the esters are well known in the art and have been described in detail, for example, in U.S. Pats. 3,087,936; 3,163,603; 3,172,892; 3,189,544; 3,215,707; 3,219,666; 3,231,587; 3,272,746; 3,288,714; 3,306,907; 3,331,776; 3,340,281; 3,341,542; 3,346,354; and 3,381,022. In the in the interest of brevity, these patents are incorporated herein for their disclosure of suitable mono- and polycarboxylic acid acylating agents which can be used for the preparation of the esters used as starting materials in the present invention.

As disclosed in the foregoing patents, there are several processes for preparing the acids. Generally, the process involves the reaction of (1) an ethylenically unsaturated carboxylic acid, lower alkyl ester, acid halide, or anhydride with (2) an ethylenically unsaturated polyolefin containing at least about thirty aliphatic carbon atoms or a halogenated polyolefin or hydrocarbon containing at least about thirty aliphatic carbon atoms at a temperature within the range of about 100°–300° C. The halogenated hydrocarbon, usually a brominated or chlorinated hydrocarbon as well as an ethylenically unsaturated hydrocarbon reactant can, of course, containing polar substituents, oil-solubilizing pendant groups and be unsaturated within the general limitations explained hereinabove. It is these hydrocarbon reactants which provides most of the aliphatic carbon atoms present in the acyl moiety of the acylating agent.

When preparing the carboxylic acid acylating agent according to these two processes, the carboxylic acid reactant usually corresponds to the formula $R_o$—$(COOH)_n$, where $R_o$ is characterized by the presence of at least one ethylenically unsaturated carbon-to-carbon covalent bond and $n$ is an integer from one to six and preferably one or two. The acid reactant can also be the corresponding carboxylic acid halide, anhydride, ester, or other equivalent acylating derivative and mixtures of one or more of these. Ordinarily, the total number of carbon atoms in the acid reactant will not exceed ten and generally will not exceed six. Preferably the acid reactant will have at least one ethylenic linkage in an $\alpha,\beta$-position with respect to at least one carboxyl function. Exemplary acidic reactants are acrylic acid, methacrylic acid, maleic acid, maleic anhydride, fumaric acid, itaconic acid, itaconic anhydride, citraconic acid, citraconic anhydride, mesaconic acid, glutaconic acid, chloromaleic acid, aconitic acid, crotonic acid, methylcrotonic acid, sorbic acid, 3-hexenoic acid, 10-decenoic acid, 2-pentene-1,3,5-tricarboxylic acid, and the like. Due to considerations of economy and availability, these acid reactants usually employed are acrylic acid, methacrylic acid, maleic acid, and maleic anhydride.

The substantially saturated aliphatic hydrocarbon-substituted succinic acid and anhydrides are especially preferred as acylating agents. These succinic acid acylating agents are readily prepared by reacting maleic anhydride with a high molecular weight olefin or a halogenated hydrocarbon such as a chlorinated polyolefin. The reaction involves merely heating the two reactants at a temperature of about 100°–300° C., preferably, 100°–200° C. The product from such a reaction is a substituted succinic anhydride where the substituent is derived from the olefin or chlorinated hydrocarbon as described in the above cited patents. The product may be hydrogenated to remove all or a portion of any ethylenically unsaturated covalent linkages by standard hydrogenation procedures, if desired. The substituted succinic anhydrides may be hydrolyzed by treatment with water or steam to the corresponding acid and either the anhydride or the acid may be converted to the corresponding acid halide or ester by reacting with phosphorus halide, phenols, or alcohols.

The acylating agents can also be prepared by contacting a polyolefin with an acid of the formula $R_o$—$(COOH)_n$ in the presence of chlorine according to the techniques disclosed in 3,215,707 and 3,231,587.

The acylating agents may also be prepared by halogenating a high molecular weight hydrocarbon such as the above described olefin polymers to produce a polyhalogenated product, converting the poly-halogenated product to a polynitrile, and then hydrolyzing the polynitrile. They may be prepared by oxidation of a high molecular weight polyhydric alcohol with potassium permanganate, nitric acid, or a similar oxidizing agent. Mono-carboxylic acid acylating agents may be obtained by oxidizing a mono-alcohol with potassium permanganate or by reacting a halogenated high molecular weight olefin polymer with a ketene. Another convenient method for preparing monocarboxylic acid involves the reaction of metallic sodium with an acetoacetic ester or a malonic ester of an alkanol to form a sodium derivative of the ester and the subsequent reaction of the sodium derivative with a halogenated hight molecular weight hydrocarbon such as brominated wax or brominated polyisobutene.

Mono-carboxylic and poly-carboxylic acid acylating agents can also be obtained by reacting chlorinated mono- and poly-carboxylic acids, anhydrides, acyl halides, and the like with ethylenically unsaturated hydrocarbons or ethylenically unsaturated substituted hydrocarbons such as the polyolefins and substituted polyolefins described hereinbefore in the manner described in 3,340,281.

The mono-carboxylic and poly-carboxylic acid anhydrides are obtained by dehydrating the corresponding acids. Dehydration is readily accomplished by heating the acid to a temperature above about 70° C., preferably in the presence of a dehydration agent, e.g. acetic anhydride. Cyclic anhydrides are usually obtained from poly-carboxylic acids having acid radicals separated by no more than three carbon atoms such as substituted succinic or glutaric acid, whereas linear anhydrides are obtained from poly-carboxylic acids having the acid radicals separated by four or more carbon atoms. The acid halides of the mono-carboxylic and poly-carboxylic acids can be prepared by the reaction of the acids or their anhydrides with a halogenating agent such as phosphorus tribromide, phosphorus pentachloride, or thionyl chloride.

The ethylenically unsaturated hydrocarbon reactant and the halogenated hydrocarbon reactant used in the preparation of the acylating agents are principally the high molecular weight, substantially saturated petroleum fractions and substantially saturated olefin polymers and the corresponding chlorinated products. The 1-olefin polymers and chlorinated 1-olefin polymers derived from mono-olefins having from two to about thirty carbon atoms are preferred. The especially useful polymers are the polymers of 1-monoolefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. These are exemplified by 2-butene, 3-pentene, and 4-octene.

The interpolymers of 1-monoolefins such as illustrated above with each other and with other interpolymerizable olefinic substances such as aromatic olefins, cyclic olefins, and polyolefins, are also useful sources of the ethylenically unsaturated reactant. Such interpolymers include for example, those prepared by polymerizing ethylene with propylene, isobutene with styrene, isobutene with butadiene, propene with isoprene, propene with isobutene, ethylene with piperylene, isobutene with chloroprene, isobutene with p-methyl-styrene, 1-hexene with 1,3-hexadiene, 1-octene with 1-hexene, 1-heptene with 1-pentene, 3-methyl-1-butene with 1-octene, 3,3-dimethyl - 1 - pentene with 1-hexene, isobutene with styrene and piperylene, etc.

The halogenated hydrocarbons, halogenated polyolefins, and ethylenically unsaturated hydrocarbons used in the preparation of the acylating agents can have molecular weights of from about 700 up to about 100,000 or even higher. The preferred polyolefins and halogenated polyolefins are those having an average molecular weight of about 700 to about 5,000.

In lieu of the high molecular weight hydrocarbons and halogenated hydrocarbons discussed above, hydrocarbons containing activating polar substituents which are capable of activating the hydrocarbon molecule in respect to reaction with an ethylenically unsaturated acid reactant may be used in the above-illustrated reactions for preparing the acylating agents. Such polar substituents include sulfide and disulfide linkages, and nitro, mercapto, carbonyl, and formyl radicals. Examples of these polar-substituted hydrocarbons include polypropene sulfide, di-polyisobutene disulfide, nitrated mineral oil, di-polyethylene sulfide, etc.

Reactant (B) is a polyoxyalkylene alcohol which is a demulsifier for aqueous emulsions. The terminology "demulsifier for aqueous emulsions" as used in the present specification and claims is intended to describe those polyoxyalkylene alcohols which are capable of preventing or retarding the formation of aqueous emulsions or "breaking" aqueous emulsions. The terminology "aqueous emulsion" is generic to oil-in-water, water-in-oil, fuel-in-water, and water-in-fuel emulsions.

Many commercially available polyoxyalkylene alcohol demulsifiers can be used as reactant (B). Useful demulsifiers are the reaction products of various organic amines, carboxylic acid amides, and quaternary ammonium salts with ethyleneoxide. Such polyoxyethylated amines, amides, and quaternary salts are available from Armour Industrial Chemical Co. under the names Ethoduomeen T, an ethyleneoxide condensation product of an N-alkyl alkylenediamine under the name Duomeen T; Ethomeens, tertiary amines which are ethyleneoxide condensation products of primary fatty amines; Ethomids, ethyleneoxide condensates of fatty acid amides; and Ethoquads, polyoxyethylated quaternary ammonium salts such as quaternary ammonium chlorides.

The preferred demulsifiers are liquid polyoxyalkylene alcohols and derivatives thereof. The derivatives contemplated are the hydrocarbyl ethers and the carboxylic acid esters obtained by reacting the alcohols with various carboxylic acids. Illustrative hydrocarbyl groups are alkyl, cycloalkyl, alkylaryl, aralkyl, alkylaryl alkyl, etc., containing up to about forty carbon atoms. Specific hydrocarbyl groups are methyl, butyl, dodecyl, tolyl, phenyl, naphthyl, dodecylphenyl, p-octylphenyl ethyl, cyclohexyl, and the like. Carboxylic acids useful in preparing the ester derivatives are mono- or polycarboxylic acids such as acetic acid, valeric acid, lauric acid, stearic acid, succinic acid, and alkyl or alkenyl-substituted succinic acids wherein the alkyl or alkenyl group contains up to about twenty carbon atoms. Members of this class of alcohols are commercially available from various sources; e.g., Pluronic and Tetronic polyols from Wyandotte Chemicals Corporation; Polyglycol 112-2, a liquid triol derived from ethyleneoxide and propyleneoxide available from Dow Chemical Co.; and Tergitols, dodecylphenyl or nonylphenyl polyethylene glycol ethers, and Ucons, polyalkylene glycols and various derivatives thereof, both available from Union Carbide Corporation. However, the demulsifiers used as reactant (B) must have an average of at least one free alcoholic hydroxyl group per molecule of polyoxyalkylene alcohol. An alcoholic hydroxyl group is one attached to a carbon atom that does not form part of an aromatic nucleus.

In this class of preferred polyoxyalkylene alcohols are those polyols prepared as "block" polymers. Thus, a hydroxy-substituted compound, $R-(OH)_m$ (where $m$ is 1 to 6, preferably 2 to 3, and R is the residue of a mono- or polyhydric alcohol or mono- or polyhydroxy phenol, naphthol, etc.) is reacted with an alkylene oxide,

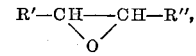

to form a hydrophobic base, R' being a lower alkyl group of up to four carbon atoms, R" being H or the same as R' with the proviso that the alkylene oxide does not contain in excess of ten carbon atoms. This base is then reacted with ethylene oxide to provide a hydrophylic portion resulting in a molecule having both hydrophobic and hydrophylic portions. The relative sizes of these portions can be adjusted by regulating the ratio of reactants, time of reaction, etc., as is obvious to those skilled in the art. It is within the skill of the art to prepare such polyols whose molecules are characterized by hydrophobic and hydrophylic moieties present in a ratio rendering them suitable as demulsifiers for aqueous emulsions in various lubricant and fuel compositions and thus suitable as reactant (B). Thus, if more oil- or fuel-solubility is needed in a given lubricant or fuel composition, the hydrophobic portion can be increased and/or hydrophylic portion decreased. If greater aqueous emulsion breaking capability is required, the hydrophylic and/or hydrophobic portions can be adjusted to accomplish this.

Compounds illustrative of $R-(OH)_m$ include aliphatic polyols such as the alkylene glycols and alkane polyols, e.g., ethylene glycol, propylene glycol, trimethylene glycol, glycerol, pentaerythritol, erythritol, sorbitol, mannitol, and the like and aromatic hydroxy compounds such as alkylated mono- and polyhydric phenols and naphthols e.g., cresols, heptylphenols, dodecylphenols, dioctylphenols, triheptylphenols, resorcinols, pyrogallol, etc.

Polyoxyalkylene polyol demulsifiers which have two to three hydroxyl groups and molecules consisting essentially of hydrophobic portions comprising

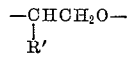

groups where R' is lower alkyl of up to three carbon atoms and hydrophylic portions comprising

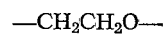

groups are particularly preferred as reactant (B). Such polyols can be prepared by first reacting a compound of the formula $R-(OH)_m$ where $m$ is 2–3 with a terminal alkylene oxide of the formula

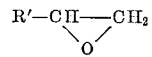

and then reacting that product with ethylene oxide. $R-(OH)_m$ can be, for example, TMP (trimethylolpropane), TME (trimethylolethane), ethylene glycol, trimethylene glycol, tetramethylene glycol, tri-(β-hydroxypropyl)-amine, 1,4-(2-hydroxyethyl) - cyclohexane, N,N, N',N'-tetrakis-(2-hydroxypropyl)ethylene diamine, N,N, N',N'-tetrakis(2-hydroxyethyl) - ethylene diamine, naphthol, alkylated naphthol, resorcinol, or one of the other illustrative examples mentioned hereinbefore.

The polyoxyalkylene alcohol demulsifiers should have an average molecular weight of about 1000 to about 10,000, preferably about 2000 to about 7000. The ethyleneoxy groups (i.e., —$CH_2CH_2O$—) normally will comprise from about 5% to about 40% of the total average molecular weight. Those polyoxyalkylene polyols where the ethyleneoxy groups comprise from about 10% to about 30% of the total average molecular weight are especially useful as reactant (B). Polyoxyalkylene polyols having an average molecular weight of about 2500 to about 6000 where approximately 10%–20% by weight of the molecule is attributable ethyleneoxy groups result in the formation of esters having particularly improved properties. The ester and ether derivatives of these polyols are also useful as reactant (B).

Representative of such polyoxyalkylene polyols are the liquid polyols available from Wyandotte Chemicals Corporation under the name Pluronic Polyols and other similar polyols. These Pluronic Polyols correspond to the Formula I:

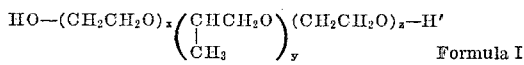

Formula I wherein $x$, $y$, and $z$ are integers greater than 1 such that the CH$_2$CH$_2$O groups comprise from about 10% to about 15% by weight of the total molecular weight of the glycol, the average molecular weight of said polyols being from about 2500 to about 4500. This type of polyol can be prepared by reacting propylene glycol with propylene oxide and then with ethylene oxide.

Another group of polyoxyalkylene alcohol demulsifiers illustrative of the preferred class discussed above are the commercially available liquid Tetronic polyols sold by Wyandotte Chemicals Corporation. These polyols are represented by the general formula:

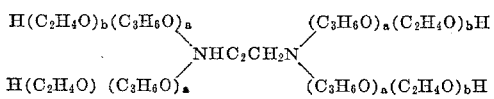

Such polyols are described in U.S. Pat. No. 2,979,528 which is expressly incorporated herein by reference. Those polyols corresponding to the above formula having an average molecular weight of up to about 10,000 wherein the ethyleneoxy groups contribute to the total molecular weight in the percentage ranges discussed above are preferred. A specific example would be such a polyol having an average molecular weight of about 8000 wherein the ethyleneoxy groups account for 7.5%–12% by weight of the total molecular weight. Such polyols can be prepared by reacting an alkylene diamine such as ethylene diamine, propylene diamine, hexamethylene diamine, etc., with propylene oxide until the desired weight of the hydrophobic portion is reached. Then the resulting product is reacted with ethylene oxide to add the desired number of hydrophylic units to the molecules.

Another commercially available polyoxyalkylene polyol falling within this preferred group is Dow Polyglycol 112–2, a triol having an average molecular weight of about 4000–5000 prepared from propylene oxides and ethylene oxides, the ethyleneoxy groups comprising about 18% by weight of the triol. Such triols can be prepared by first reacting glycerol, TME, TMP, etc., with propylene oxide to form a hydrophobic base and reacting that base with ethylene oxide to add hydrophylic portions.

Reactant (C) is at least one member selected from the class consisting of polyhydric alcohols, amines, and basically reacting Group IIa metal compounds. Thus (C) can be a single polyhydric alcohol, a mixture of polyhydric alcohols, a combination of a single polyhydric alcohol and a single basically reacting metal compound, a single amine or a mixture of various amines, a combination of a mixture of polyhydric alcohols and a mixture of ethylene polyamines, a combination of a single type of amine and a single basically reacting metal compound, a mixture of various Group IIa basically reacting metal compounds and the like. Preferably, reactant (C) is a polyhydric alcohol.

The polyhydric alcohols useful as reactant (C) generally have from two to ten hydroxyl groups and up to twenty aliphatic carbon atoms. They are quite diverse in structure and chemical composition. Typical polyhydric alcohols are alkylene glycols such as ethylene glycol, propylene glycol, trimethylene glycol, butylene glycol, and polyglycols such as diethylene glycol, triethylene glycol, tetraethylene glycol, dipropylene glycol, tripropylene glycol, dibutylene glycol, tributylene glycol, and other alkylene glycols and polyalkylene glycols in which the alkylene radical contains from 2 to about 8 carbon atoms. Other useful polyhydric alcohols include glycerol, monomethyl ether of glycerol, pentaerythritol, 9,10-dihydroxystearic acid, the ethyl ester of 9,10-dihydroxystearic acid, 3-chloro-1,2-propanediol, 1,2-butanediol, 1,4-butanediol, 2,3-hexanediol, 2,3-hexanediol, pinacol, erythritol, arabitol, sorbitol, mannitol, 1,2-cyclohexanediol, 1,4-cyclohexanediol, 1,4-(2-hydroxyethyl)-cyclohexane, 1,4-dihydroxy-2-nitro-butane, 1,4-di(2-hydroxyethyl)-benzene, dipentaerythritol, copolymers of allyl alcohol and styrene, the carbohydrates such as glucose, arabitose, ramnose, mannose, and galactose, amino alcohols such as di(2-hydroxyethyl)amine, tri-(3-hydroxypropyl)amine, N,N'-di(hydroxyethyl)ethylenediamine, N,N-di-(2-hydroxyethyl)-glycine and esters thereof with lower mono- and polyhydric aliphatic alcohols, N,N,N';N'-tetrakis(2-hydroxyethyl)ethylenediamine, N,N,N',N'-tetrakis(2-hydroxypropyl)ethylenediamine; and the like.

Included within this group of polyhydric alcohols are those characterized by the presence of at least two free hydroxyl groups and at least one hydroxyl group which has been esterified with a mono-carboxylic acid having from eight to about thirty carbon atoms such as octanoic acid, oleic acid, stearic acid, linoleic acid, dodecanoic acid, or tall oil acid. Examples of such partially esterified polyhydric alcohols are the mono-oleate of sorbitol, the mono-oleate of glycerol, the mono-stearate of glycerol, the di-stearate of sorbitol, and the di-dodecanoate of erythritol.

A preferred class of alcohols are the polyhydric aliphatic alcohols containing up to ten carbon atoms. This class of alcohols includes glycerol, erythritol, pentaerythritol, glyconic acid, glyceraldehyde, glucose, arabinose, 1,7-heptanediol, 2,4-heptanediol, 1,2,3-hexanetriol, 1,2,4-hexanetriol 1,2,5-hexanetriol, 2,3,4-hexanetriol, 1,2,3-butanetriol, 1,2,4-butanetriol, quinic acid, 2,2,6,6-tetrakis-(hydroxymethyl)-cyclohexanol, 1,10-decanediol, digitalose, and the like. The polyhydric aliphatic alcohols containing at least three hydroxyl groups and up to ten carbon atoms are particularly preferred.

An especially preferred class of polyhydric alcohols are the polyhydric alkanols containing three to ten, especially three to six carbon atoms and having at least three hydroxyl groups. Such alcohols are exemplified by glycerol, β-hydroxymethyl-2-methyl-1,3-propanediol (i.e., trimethylolethane or TME), 2-hydroxymethyl-2-ethyl-1,3-propanediol (i.e., trimethylolpropane or TMP), 1,2,4-butanetriol, 1,2,6-hexanetriol, 1,2,3-pentanetriol, 1,2,3-hexanetriol 1,2,4-hexanetriol, 1,2,5-hexanetriol 2,3,4-hexanetriol, mannitol, pentaerythritol, sorbitol, and mixtures thereof. The most preferred polyhydric alkanols are those containing at least four hydroxy groups. This class is exemplified by pentaerythritol, erythritol, threitol, ribitol, xylitol, arabitol, sorbitol, mannitol, and mixtures of two or more of these alcohols.

The amines contemplated as being useful as reactant (C) are primary or secondary amines characterized by a radical having the configuration

The two remaining valences of the nitrogen atom of the

radical preferably are satisfied by hydrogen, amino, substituted amino, or an organic radical bonded to said nitrogen atom through direct carbon-to-nitrogen linkages. These amines include ammonia, aliphatic monoamines and polyamines, aromatic amines, heterocyclic amines, carboxylic amines, arylene amines, alkylene amines, N-hydroxyalkyl-substituted amines, and the like. Specific amines are methylamine, N-methylethylamine, N-cyclohexyl-aniline, dibutylamine, cyclohexylamine, aniline, di-(p-methylphenyl)amine, dodecylamine, octadecylamine, o-phenylenediamine, N,N'-di-(n-butyl)-p-phenylenediamine, morpholine, piperazine, pyrrolidine, indole, piperidine, hexahydro - 1,3,5 - triazine, 1-H-1,2,4-triazole, melamine, bis(p-aminophenyl)methane, phenylmethylamine, cyclohexylamine, pyrrolidine, 3-amino-5,6-diphenyl-1,2,4-triazine, 2-octadecylimidazoline, 2-phenyl-4-methyl-imidozolidine, oxazolidine, ethanolamine, diethanolamine, 2-heptyl-oxazolidine, N-(2 - hydroxyethyl)ethylenediamine, N,N'-bis(2-hydroxyethyl)-ethylenediamine, 1-(2-hydroxyethyl)piperazine, mono-hydroxypropyl-substituted diethylenetriamine, 1-(2-hydroxypropyl)piperazine, di-(hydroxypropyl)-substituted tetraethylenepentamine, N - (3-hydroxypropyl)tetramethylenediamine, N - (aminoalkyl) amines such as tris(aminoethyl)-amine, and 1-di(2-aminoethyl)-diethylenetriamine.

The preferred amines are the alkylenepolyamines conforming for the most part to the formula

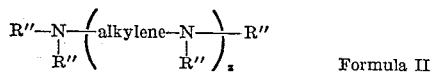

Formula II where $p$ is an integer of one to nine and R'' is hydrogen, alkyl, hydroxyalkyl, aminoalkyl, or

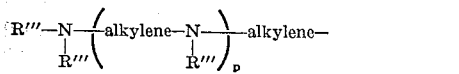

where $p'$ is an integer of one to nine providing $p$ and $p'$ do not exceed nine, R''' is hydrogen, alkyl, hydroxylalkyl, aminoalkyl and at least one R'' per molecule is hydrogen. The alkylene radicals can contain one to seven carbon atoms. These alkylene polyamines include principally methylenepolyamines, ethylenepolyamines, butylenepolyamines, propylenepolyamines, pentylenepolyamines, hexylenepolyamines, heptylenepolyamines, octylenepolyamines, other polymethylene amines, the cyclic analogs and the higher homologs of these amines such as piperazine and aminoalkyl-substituted piperazines. The hydroxyalkyl-substituted and aminoalkyl-substituted polyamines include those in which the alkyl group is a lower alkyl group, i.e., one having no more than seven carbon atoms. Mixtures of such alkylenepolyamines may be used as reactant (C). Indeed, in view of the fact that most commercially available alkylenepolyamines are mixtures, such mixtures will normally be employed when it is desired to use an alkylenepolyamine as (C). The most preferred amines are the alkylene polyamines of Formula II where the R'' variables are hydrogen, aminoalkyl, or

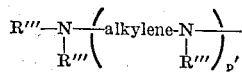

where R''' is hydrogen and the alkylene groups are ethylene or propylene and mixtures of such polyamines.

Another class of especially suitable amines can be described as polyoxyalkylene polyamines. This class of amines can be generically represented by the formulae

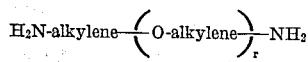

or

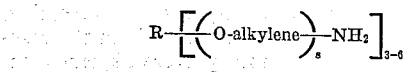

where $r$ has an average value of about 2 to about 40, $s$ has an average value of about 1 to about 12 with the proviso that each -(O-alkylene)- group on a given molecule may have a different value for $s$, R is a tri- to hexavalent organic radical, usually hydrocarbon radical and preferably a saturated aliphatic hydrocarbon radical such as

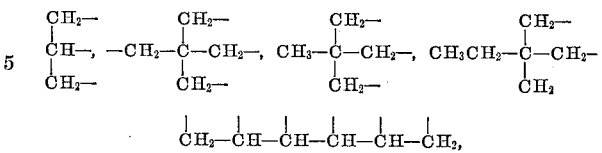

etc., and the alkylene groups may contain from two to eight carbon atoms but normally only two to four carbon atoms. Preferably, the alkylene groups are ethylene or propylene groups or mixtures of these. Such polyoxyalkylene polyamines are commercially available. For example Jefferson Chemical Company, Inc., sells such polyamines under the names Jeffamine D–230, D–400, D–1000, D–2000, and T–403.

Other suitable amines include ureas, thioureas, hydrazines, guanidines, amidines, amides, thioamides, cyanamides, etc. Specific examples illustrating such compounds are: hydrazine, phenylhydrazine, N,N''-diphenylhydrazine, octadecylhydrazine, benzoylhydrazine, urea, thiourea, N-butylurea, stearylamide, oleylamide, guanidine, 1,3-diphenylguanidine, 1,2,3-tributylguanidine, benzamidine, octadecamidine, N,N'-dimethylstearamidine, cyanamide, dicyandiamide, guanylurea, aminoguanidine, etc.

Reactant (C) can also be a Group IIa basically reacting metal compound. Generally, the metal compound will be a lower alkoxide, an oxide, a hydroxide, a carbonate, a sulfide, a hydrosulfide, or amide. Specific examples of these basically reacting metal compounds include barium oxide, barium hydroxide, barium methoxide, calcium ethoxide, strontium isopropoxide, calcium hydroxide, magnesium oxide, and the like. The basically reacting inorganic compounds of calcium, barium, and magnesium are particularly preferred, especially the oxides and hydroxides, because of their availability, economy, and usefulness of the products thereby obtained.

Reactant (D) is a base selected from the group consisting of amines, basically reacting Group IIa metal compounds, and mixtures of two or more of these materials. The basically reacting metal compounds and the amines contemplated as being useful as reactant (D) are the same as those described in the discussion of reactant (C) hereinabove. However, the amines are the preferred bases. The alkylene polyamines having from two to three carbon atoms in the alkylene groups and from three to seven amino nitrogens and mixtures thereof are especially useful. The polyoxyalkylene polyamines described hereinabove are also an especially useful class of amines. Mixtures of alkylene polyamines and polyoxyalkylene polyamides are also very useful as reactant (D).

The esterification conditions contemplated by the present invention are those conditions conventionally employed in the preparation of carboxylic acid esters. Thus, the foregoing reactants are contacted and heated at a temperature of from about 50° C. up to the decomposition temperature of that reactant having the lowest decomposition point, but generally at a temperature of at least 100° C. up to about 300° C. Reaction temperatures of about 150° C. to about 250° C. give good results. The duration of contact and heating of the various reactants will obviously depend on the identity of the particular reactant, the reaction temperature, the quantity of reactants, the presence of catalysts, and other well-known variables. For small quantities of reactants contacted and heated on a laboratory scale, reaction time of about 0.1 to about twelve hours will generally be sufficient while commercial quantities of reactants contacted and heated in large commercial reactors may require a greater period of heating, e.g., up to twenty-four hours or more.

The reactions involving the amine or basically reacting metal compounds are obviously not esterification reactions. When the ester-containing compositions are contacted with amines or when the acylating agents are reacted directly with the polyoxyalkylene alcohol demulsifier and an amine, unesterified carboxyl groups or equivalent acylating derivatives thereof (e.g.,

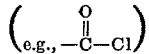

react with the amino groups to form amine salts, amides, imides, amidines, and mixtures of two or more of these. Similarly, the basically reacting metal compound reacts with unreacted carboxyl groups to form metal carboxylate groups.

The esterification conditions include the use of conventional esterification catalyst to promote the esterification reaction. Suitable catalyst include sulfuric acid, pyridine hydrochloride, hydrochloric acid, benzene sulfonic acid, p-toluene sulfonic acid, phosphoric acid, and other known esterification catalysts. The catalyst, if present, can be employed in amounts of from about 0.01% to about 5% by weight based on the total weight of acylating agent and alcohol present.

The reactants can be contacted in the presence or absence of liquid diluents. Ordinarily, the presence of a diluent facilitates mixing, temperature control, and handling of the reaction mixture. Suitable diluents include the aliphatic, cycloaliphatic, and aromatic hydrocarbons and the corresponding chlorinated hydrocarbons such as benzene, toluene, xylene, chlorobenzene, hexane, heptane, cyclohexane, or mixtures of these. Mineral oils are very good diluents, particularly if the composition produced by the reaction is one that is later to be employed in a mineral lubricating oil composition. Other inert organic diluents can also be employed such as ethers, sulfoxides, sulfones, and the like. Where the reactant is itself a liquid at the reaction temperature, it also functions as a diluent and it is sometimes convenient to employ an excess amount of a reactant to serve this purpose.

As the conditions ordinarily employed for preparing carboxylic acid esters of alcohols are well known, no further detailed description of these conventional esterification conditions is necessary. For example, a detailed discussion and illustration of esterification conditions suitable for the process of the present invention is found in U.S. Pat. 3,481,022.

For purposes of describing the present invention, the number of equivalents contained in a carboxylic acid acylating agent, (A) depends upon the number of carboxyl groups present or equivalent acylating functional derivatives thereof such as

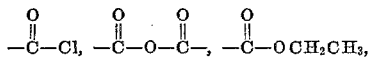

and the like. Therefore, a polyisobutenyl-substituted succinic anhydride has two equivalents per mole; a polypropylene-substituted acrylic acid has one equivalent per mole; and a polyisobutylene containing an average of two succinic acid groups per molecule has four equivalents per mole. The number of equivalents of alcohols, that is, reactant (B) or the polyhydric alcohol reactants encompassed by (C) is determined by the number of hydroxyl groups present in the molecule. For example, a polyoxyalkylene alcohol demulsifier having one hydroxy group per molecule has one equivalent per average molecular weight thereof; a polyoxyalkylenediol demulsifier, two; a polyoxyalkylenetriol demulsifier, three. Pentaerythritol, and erythritol each have four equivalents per mole while glycerol, TME, and TMP each have three equivalents per mole. The number of equivalents of an amine depends upon the number of

groups present therein. Thus, an ethylene polyamine having an average composition corresponding to that of tetraethylenepentamine has five equivalents per mole; diethylenetriamine, three; pentaethylenehexamine, six; 1-(aminoalkyl)-piperazine, two. Obviously, Group IIa basically reacting metal compounds contain two equivalents per mole. Thus, barium hydroxide, barium oxide, barium ethoxide, and the like each contain two equivalents per mole. Where a mixture of different reactants is used for (A), (B), (C), or (D), the number of equivalents contained in a given amount of reactant will depend upon the specific components of the mixture and the amounts of each present.

According to one aspect of this invention, at least one carboxylic acid acylating agent is reacted under esterification conditions with at least one polyoxyalkylene demulsifier in amounts such that there is at least about 0.001 equivalent of demulsifier for each equivalent of acylating agent employed. From a consideration of the stoichiometry involved in the reaction of the carboxylic acid acylating agent and an alcohol, there is theoretically no need to employ more than one mole of demulsifier for each equivalent of acylating agent although even greater amounts of demulsifier can be employed, for example, up to two or three moles per equivalent, particularly if the demulsifier is to function as a diluent or if an excess of a demulsifier is desired to promote an increase in the rate and quantity of ester produced.

However, it has been found that the desired improvements in lubricants and fuels provided by the present invention, can be achieved if sufficient ester of polyoxyalkylene alcohol demulsifier is incorporated into the lubricant or fuels so that from about 0.00005% to about 5% by weight of the total weight of the final lubricant or fuel composition is attributable to the polyoxyalkylene alcohol demulsifier moiety of the ester. Preferably, the polyoxyalkylene alcohol demulsifier moiety will account for about 0.0001% to about 1.0% by weight of the total weight of the final lubricant or fuel. Thus, if one completely esterifies the acylating agent with polyoxyalkylene alcohol demulsifier, only a small amount of such an ester is needed to provide the desired concentration of the demulsified moiety in the final lubricant or fuel.

Some of the esters of the polyoxyalkylene alcohol demulsifiers are not infinitely soluble in lubricating oils and fuels. Due to the small amounts of ester required as indicated above, solubility is no real problem. However, if the acylating agent is completely or substantially completely esterified, the resulting ester-containing composition may not be completely soluble in a lubricating oil or normally liquid fuel at high concentrations. Therefore, incorporating such an ester-containing composition into a lubricant or fuel may require mixing the composition with a large volume of a given lubricant or fuel to dissolve or stably disperse it. Due to such solubility considerations, the number of equivalents of demulsifier for each equivalent of acylating agent desirably will not exceed 0.5 and usually will not exceed 0.25. Preferably, for most uses in lubricants and fuels, the number of equivalents of demulsifier for each equivalent of acrylating agent will not exceed about 0.1. The remaining unreacted acylating agent in the ester-containing composition thus produced functions as a peptizing agent and helps solubilize or stably disperse the ester product. Moreover, when the unreacted acid groups of the acylating agent are the carboxyl groups per se, the corresponding anhydrides, or lower alkyl esters (e.g., carbomethoxy, carboethoxy, etc.), the acylating agent also serves as a dispersant or detergent. See, for example, U.S. Pats. 3,288,714; 3,346,354; and 3,381,022.

According to a more preferred aspect of this invention, the ester-containing composition resulting from the reaction of the acylating agent with the polyoxyalkylene alcohol demulsifier is itself contacted with at least one member selected from the class constsing of polyhydric alcohols, amines, and basically reacting Group IIa metal compounds or mixtures thereof under esterification conditions as defined above. The amount of polyhydric alcohol, amine, metal compound or mixture of two or more of these is such that there is at least about 0.01 equivalent thereof for each equivalent of acylating agent intially employed in the reaction with the emulsifier. Where the acylating agent has been reacted with the demulsifier in amounts such that there is at least about one equivalent of demulsifier for each equivalent of acylating agent, this small quantity of polyhydric alcohol, amine, metal compound, or mixture thereof is sufficient to react with minor amounts of non-esterified carboxyl groups which may be present.

As mentioned above, however, the maximum amount of demulsifier generally employed in the reaction with the acylating agent is such that there is not more than about 0.5, desirably not more than about 0.25, equivalent of demulsifier for each equivalent of acylating agent. It has been found that a better product generally results if a combination of demulsifier and the polyhydric alcohol, amine, metal compound or mixture thereof is used which furnishes at least about 0.5 equivalent of the combination for each equivalent of acylating agent. For most uses in lubricants and fuels, it is desirable that the ester-containing compositions of this invention be substantially free from unreacted carboxyl groups or their functional equivalents. Thus, the combination preferably will provide at least about one equivalent for each equivalent of acylating agent. Of course, excess polyhydric alcohol, amine, metal compound or mixture thereof can be used. For example, if about 0.1 equivalent of demulsifier is reacted with each equivalent of acylating agent to produce an ester-containing composition, then one to ten or more equivalents of polyhydric alcohol, amine, metal compound, or mixture thereof may be contacted with the ester-containing composition. However, from the viewpoint of the stoichiometry involved, there is usually no benefit in providing more than one mole of the polyhydric alcohol, amine, or metal compound or mixture thereof for each equivalent of acylating agent although larger excesses may serve other purposes as mentioned above. Preferably, there will be at least 0.1 equivalent of polyhydric alcohol, amine, metal compound or mixture thereof for each equivalent of non-esterified acid group in the ester-containing composition resulting from the reaction of the acylating agent and the demulsifier.

In another preferred aspect of the invention, the carboxylic acid acylating agent is reacted simultaneously with both the demulsifier and at least one other reactant of the group selected from the class consisting of polyhydric alcohols, amines, Group IIa basically reacting metal compounds, or mixtures of these although the acylating agent can first be reacted with said other reactant and that product then reacted with the demulsifier. According to this aspect of the invention, there is at least a 0.001 equivalent of demulsifier and at least 0.001 equivalent of said other reactant for each equivalent of acylating agent. As before, the total amount of demulsifier employed generally will not exceed 0.5, usually 0.25, equivalents per equivalent of acylating agent. For better results in most lubricant and fuel applications, there will not be more than about 0.1 equivalent of demulsifier for each equivalent of acylating agent. Again, the combination of demulsifier and said other reactant generally should provide a total of at least 0.5 equivalent for each equivalent of acylating agent. A preferred minimum amount for said other reactant is that amount which provides at least about 0.1 equivalent thereof for each equivalent of acylating agent initially employed.

In a very useful embodiment of this most preferred aspect, a polycarboxylic acid acylating agent having an average of at least about fifty aliphatic carbon atoms per molecule exclusive of carboxyl carbon atoms is reacted under esterification conditions with at least one polyoxyalkylene alcohol demulsifier and at least one polyhydric alkanol, particularly alkanols having at least three alcoholic hydroxyl groups and up to ten aliphatic carbon atoms, in amounts such that the ratio of the equivalents of acylating agent to demulsifier to polyhydric alkanol is represented by the ratio $1:b:c$ where $b \geq 0.001$; $c \geq 0.2$, and $b+c \geq 0.5$. Best results appear to be obtained when reactants are brought together and reacted simultaneously but it is contemplated that the polyhydric alkanol can first be reacted with the acylating agent and the product of that first reaction then contacted with the demulsifier reactant. It is particularly desirable that the acylating agent be a substituted dicarboxylic acid acylating agent in which the substituents are derived from 1-olefin polymers and halogenated 1-olefin polymers where the substituents have an average molecular weight of about 700 to about 5000; the polyoxyalkylene alcohol demulsifier should consist essentially of hydrophobic portions comprising

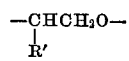

where R′ is alkyl of up to three carbon atoms and hydrophylic portions comprising —CH$_2$CH$_2$O— groups; the polyhydric alkanol contains at least three alcoholic hydroxyl groups and up to ten carbon atoms; $b$ has a value of about 0.004 to about 0.1; and $c$ has a value of about 0.5 to about 6.

Within this more preferred aspect of the invention, the most preferred aspect is the one involving the simultaneous reaction of at least one substituted succinic acid or anhydride having constituents derived from ethylenepropylene copolymers, polypropylene, polybutylene, chlorinated ethylenepropylene copolymers, chlorinated propylene, and chlorinated polybutylene, under esterification conditions with at least one polyoxyalkylene polyol having two to three hydroxyl groups and consisting essentially of hydrophobic portions comprising

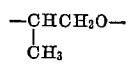

groups and hydrophylic portions comprising

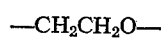

groups, and at least one polyhydric lower alkanol containing three to six hydroxyl groups and up to six aliphatic carbon atoms where $b$ has a value of 0.005 to about 0.05 and $c$ has a value of at least about 0.75.

In another variation of the preferred aspect of this invention, the ester-containing composition produced by the reaction, under esterification conditions as defined above, of the acylating agent, the polyoxyalkylene alcohol, and the polyhydric alkanol is subsequently contacted with a base selected from the group consisting of amines, basically reacting Group IIa metal compounds, and mixtures thereof, that is, Reactant D, the amount of base being such that there is at least about one equivalent thereof for each unesterified acid group of the acylating agent, i.e., a carboxyl group or acylating functional derivative thereof. Preferably, the base will be an alkylenepolyamine of the type described hereinbefore, preferably an ethylene polyamine having an average of three to seven amino nitrogens. Again, based on stoichiometric considerations, there ordinarily is no advantage in contacting the ester-containing composition with more than about one mole of the base for each equivalent of unesterified acidic groups in the acylating agent.

As is apparent to those skilled in the art from the foregoing discussion, the above descriptions of the various aspects of the processes of this invention set forth the total amounts of the various reactants to be employed in the processes. It is not required that all of the indicated amounts enter into the reaction. In fact, in those cases where there are obvious stoichiometric excesses, it is impossible for all of the reactants to undergo the reaction. As explained above, any unreacted acylating agent actually serves a useful function in the resulting ester-containing compositions and, accordingly, in no way interferes with the use of the products as lubricant and fuel additives. Other unreacted materials generally can remain in the product without any undue adverse effect on the use of the ester-containing compositions as lubricant and fuel additives provided they are soluble in the lubricants and fuels. Insoluble reactants can be removed by conventional techniques such as distillation, decantation, filtration, centrifugation, and the like. It is also apparent that those skilled in the art may desire to apply conventional processing techniques to the reactants during or between the various steps of the reactions. For example, super atomspheric pressure may be employed in order to expedite the reaction or to increase the yield. Similarly, sub-atomspheric conditions may be used when stripping out volatile unreacted reactants. It may be desirable to decrease or increase the amount of diluent during the various steps in the process. Inert atmospheres may be employed. Likewise, an inert gaseous purge may be employed during the reaction or thereafter to assist in the removal of water from the reaction mixture. Nitrogen gas can be blown through the reaction mass during and/or after the reaction if it is desired to use such a purge. It is also contemplated that the reactions can be conducted under reflux conditions and that mechanical agitation will be applied to the reaction mixture in order to expedite the reaction. However, these and other expedients are well known in the art and do not require a detailed discussion herein.

The reaction products produced according to the processes contemplated by this invention as described hereinabove and illustrated hereinafter are complex ester-containing compositions. Thus, the product can contain esters and unreacted acylating agent; esters, unreacted acylating agent, and metal salts; ester, metal salt, and acylated amines such as amides, imides; esters and acylated amines; and the like. For that reason, it is not possible to describe the ester-containing compositions of the present invention other than in terms of the process by which they are produced.

It is not understood how the demulsifier moiety provides the improvement found in the compositions of this invention. It is theorized that as water forms in the lubricant or fuel such as by condensation, the water slowly hydrolyzes the esterified demulsifier so as to release demulsifier as the need for it comes in to being. This provides a sort of prolonged, controlled release of demulsifier into the lubricant or fuel and results in improved aqueous emulsion resistance. The manner in which the dispersancy properties, the rust properties, and/or the varnish reduction properties of the products is improved is not understood. It is clear, however, that incorporating the emulsifier into the fuel or lubricant in the form of its ester gives superior performance over the simple addition of the demulsifier per se to the lubricant or fuel. Furthermore, more of the demulsifier can be dissolved or stably dispersed in the lubricant or fuel through the incorporation of an ester of the demulsifier relative to the amounts of the free demulsifier which can be dissolved or dispersed in the lubricant or fuel.

The following examples further illustrate the processes and ester-containing compositions of the present invention. Unless otherwise indicated, all percentages and parts represent percent by weight and parts by weight, respectively.

EXAMPLE 1

(a) A high molecular weight carboxylic acid acylating agent is prepared by heating an equimolar amount of a chlorinated polyisobutylene having an average molecular weight of 2300 and a chlorine content of about 4.7% with methacrylic acid at about 190°–210° C. for about 15 hours. Subsequently, one equivalent of the acid is reacted with one equivalent of a polyoxyalkylene triol demulsifier having an average molecular weight of about 4800 prepared by first reacting propylene oxided with glycerol and thereafter reacting that product with ethylene oxide to produce a product where —$CH_2CH_2O$— groups make up about 18% by weight of the demulsifiers average molecular weight in the presence of a low viscosity mineral oil diluent for about ten hours at a temperature of about 190°–205° C. and subsequently filtered. The filtrate is the desired ester-containing composition in an oil diluent.

(b) Part (a) is repeated using an equivalent ratio of acylating agent to triol of about 1:0.1.

EXAMPLE 2

A high molecular weight monocarboxylic acid acylating agent is prepared according to the general procedure of Example 1(a) by reacting equal molar amounts of chlorinated polyisobutylene having an average molecular weight of about 1000 with acrylic acid. This acylating agent is then reacted with the triol of Example 1(a) and TME simultaneously in the presence of a low viscosity mineral oil diluent in an equivalent ratio of about 1:0.01:1.5 by heating these reactants at about 200°–210° C. for about 12 hours. The reaction mass is then filtered, the filtrate being an oil solution of the desired product.

EXAMPLE 3

(a) A mixture of 108 parts of a polyisobutenyl-substituted succinic acid anhydride having an aquivalent weight of about 540 (prepared by reacting chlorinated polyisobutylene characterized by an average molecular weight of about 1:050 and a chlorine content of 4.3% with an equal molar quantity of maleic anhydride), 480 parts of the triol of Example 1(a) (e.g., an equivalent ratio of acylating agent to triol of about 1:1.5) and 380 parts of mineral oil is heated for about 8.3 hours at 200°–205° C. while blowing nitrogen gas through the mixture to assist in water removal. On standing, the reaction product separates into two liquid layers illustrating the point made above to the effect that some of the ester-containing compositions contemplated by the present invention are not instantly soluble in lubricating oils and fuels. However, this ester-containing product can be dissolved or stably dispersed in large volumes of lubricating oils or fuels as explained hereinbefore. Nevertheless, it is clearly more convenient to control the ratio of reactants so that the ester of polyoxyalkylene alcohol demulsifier present in the ester-containing composition produced in the reaction is in an amount which will remain stably dispersed or dissolved in the other components of the reaction mass. The presence of ashless dispersants of the general type disclosed in U.S. Pats. 3,172,892 and 3,219,666 assist in solubilizing or stably dispersing the esters of the demulsifiers of this invention. The acylated nitrogen compositions of those patents prepared by reacting a substituted succinic acid or anhydride, such as an olefin-polymer-substituted succinic acid or anhydride, with an alkylene polyamine are especially useful. Such ashless dispersants can be beneficially employed in the preparation of the ester-containing compositions of this invention in amounts comprising from about 0.1% to about 20% by weight of the total reaction mass to promote solubility of dispersion of those compositions characterized by solubility problems. Obviously, the ashless dispersant when employed for this purpose can remain in the product to continue this function and to perform its usual function in the lubricant or fuel.

(b) The general procedure of (a) was repeated except that the acylating agent was simultaneously reacted with the triol and TMP in an equivalent ratio of about 1:0.03:2.

EXAMPLE 4

Following the general procedure of Example 3(a), the acylating agent of that example is reacted with a polyoxyalkylene diol demulsifier having an average molecular weight of about 3800 and consisting essentially of a hydrophobic base of

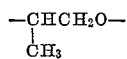

units with hydrophylic terminal portions of

units, the latter comprising approximately 10% by weight of the demulsifier, in an equivalent ratio of about 1:0.01.

EXAMPLE 5

A mixture consisting of 1869 parts (3.5 equivalents) of a polyisobutenyl-substituted succinic acid anhydride as described in Example 3(a), 236 parts (6.95 equivalents) of pentaerythritol, 59 parts (0.04 equivalent) of the triol of Example 1(a) and 700 parts of low viscosity diluent oil are heated at 190°–200° C. for 11 hours during which time nitrogen gas is bubbled through the mixture. Subsequently 700 parts of oil is added and the resulting mass filtered. The filtrate is a 40% oil solution of the desired ester-containing composition.

EXAMPLE 6

A reaction mixture consisting of 1780 parts (1.65 equivalents) of the acylating agent of Example 3(a), 220 parts of pentaerythritol (6.47 equivalents), 220 parts (0.14 equivalent) of the triol of Example 1(a) and 770 parts of low viscosity diluent oil is heated for 11 hours at 190°–200° C. with nitrogen blowing. Thereafter, 760 parts of diluent oil is added and the resulting mass filtered. The filtrate is a 40% oil solution of the desired ester-containing composition.

EXAMPLE 7

A mixture of 1869 parts of a polyisobutenyl-substituted succinic anhydride as described in Example 3(a) and 67 parts of diluent oil are heated to 90° C. while blowing nitrogen gas through the mass. Then a mixture of 132 parts of a polyethylenepolyamine mixture having an average composition corresponding to that of tetraethylene pentamine and characterized by a nitrogen content of about 36.9% and an aquivalent weight of about 38 and 33 parts of a triol as described in Example 1(a) is added to the preheated oil and acylating agent over a period of about 0.5 hours. An exothermic reaction takes place causing the temperature to rise to about 120° C. Thereafter the mixture is heated to 170° C. and maintained at that temperature for about 4.5 hours. Additional oil (666 parts) is added and the product filtered. The filtrate is an oil solution of a desired ester-containing composition.

EXAMPLE 8

A mixture of 1000 parts of a polyisobutylene having a molecular weight of about 1000 and 98 parts of maleic anhydride are heated at a temperature of about 200° to 210° C. in an inert atmosphere for a period of about 24 hours. The reaction mixture is then cooled to about 65° C. and approximately 500 parts of hexane are added and the mass filtered. Then the hexane removed from the filtrated by stripping to a temperature of 175° C. at a pressure of 10 millimeters (Hg).

The polyisobutenyl-substituted succinic anhydride thus prepared is then reacted with a polyethylenepolyamine mixture as described in Example 7 while maintaining a temperature of about 200°–210° C. in an equivalent ratio of about 1:0.7. Thereafter, a sufficient amount of the polyoxyalkylene diol described in Example 4 is added to the reaction mass to provide one equivalent of diol for each equivalent of unreacted acid group remaining in the polyisobutenyl-substituted succinic anhydride and the mixture is again heated at a temperature of about 200°–210° C. for approximately 10 hours. Diluent oil is added and the resulting mass filtered, the filtrate being an oil-solution of the desired ester-containing composition.

EXAMPLE 9

(a) A mixture comprising 1885 parts (3.64 equivalents) of the acylating agent described in Example 3(a), 248 parts (7.28 equivalents) of pentaerythritol, and 64 parts (0.03 equivalent) of the polyoxyalkylene diol described in Example 4 are heated from room temperature to 200° C. over a one hour period while blowing the mass with nitrogen gas. The mass is then maintained at a temperature of about 200°–210° C. for an additional period of about 8 hours while continuing the ntrogen blowing.

(b) To the ester-containing composition produced according to (a) above, there is added over a 0.3 hour period (while maintaining a temperature of 200°–210° C. and nitrogen blowing 39 parts (0.95 equivalent) of a polyethylenepolyamine mixture having an equivalent weight of about 41.2. The resulting mass is then maintained at a temperature of about 206°–210° C. for 2 hours during which time the nitrogen blowing is continued. Subsequently, 1800 parts of low viscosity mineral oil is added as a diluent and the resulting mass filtered at a temperature of about 110°–130° C. The filtrate is a 45% oil solution of the desired ester-containing composition.

EXAMPLE 10

(a) Another ester-containing composition of the type contemplated by the present invention is prepared by heating a mixture of 3215 parts (6.2 equivalents) of a polyisobutenyl-substituted succinic anhydride as described in Example 3(a), 422 parts (12.4 equivalents) of pentaerythritol, 55 parts (0.029 equivalent) of the polyoxyalkylene diol described in Example 4, and 55 parts (.034 equivalent) of the triol of Example 1(a) to a temperature of about 200°–210° C. with nitrogen blowing for about 6 hours. The resulting reaction mixture is an ester-containing composition of the type contemplated by the present invention.

(b) Subsequently, 67 parts (1.63 equivalents) of a polyethylenepolyamine mixture having an equivalent weight of about 41.2 is added to the composition produced according to (a) over a 0.6 hour period while maintaining a temperature of about 200°–210° C. with nitrogen blowing. The resulting mass is then heated an additional 2 hours at a temperature of about 207°–215° C. with continued nitrogen blowing and subsequently 2950 parts of low viscosity mineral diluent oil are added to the reaction mass. Upon filtration, there is produced a 45% oil solution of an ester-containing composition of the type contemplated by the present invention.

EXAMPLE 11

(a) A mixture comprising 3204 parts (6.18 equivalents) of the acylating agent of Example 3(a) above, 422 parts (12.41 equivalents) of pentaerythritol, 109 parts (0.068 equivalent) of the triol of Example 1(a) is heated to 200° C. over a 1.5 hour period with nitrogen blowing and thereafter maintained between 200°–212° C. for 2.75 hours with continued nitrogen blowing.

(b) Subsequently, there is added to the ester-containing composition produced according to (a) above, 67 parts (1.61 equivalents) of a polyethylenepolyamine mixture having an equivalent weight of about 41.2. This mass is then maintained at a temperature of about 210°–215° C. for about one hour. Then 3070 parts of low viscosity mineral diluent oil is added to the mass and this material is filtered at a temperature of about 120° C. The filtrate is a 45% oil solution of an ester-containing composition of the type contemplated by the present invention.

EXAMPLE 12

Sufficient barium hydroxide is added to the ester-containing composition produced according to Example 1(b) to provide one equivalent of barium for each equivalent of acylating agent employed in the preparation of the ester-containing composition. The mixture is heated with stirring for about one hour while maintaining a temperature of about 150°–160° C. The reaction mass is then filtered, the filtrate being an oil solution of another ester-containing composition of the type contemplated by the present invention.

EXAMPLE 13

Following the general procedure of Example 5, an acylating agent of the type described in Example 3(a) is simultaneously reacted with pentaerythritol, the polyoxyalkylene diol described in Example 4, and calcium hydroxide in a ratio of equivalents of 1:0.5:0.02:0.4. Upon filtration, there is produced a filtrate which is an oil solution of the desired ester-containing composition.

EXAMPLE 14

(a) Following the general procedure of Example 9(a), an acylating agent as described in Example 3(a), the polyoxyalkylene diol described in Example 4, and sorbitol are simultaneously reacted in equivalent ratio of 1:0.015:3.

(b) Following the general procedure of Example 9(b), the ester-containing composition produced in (a) is contacted with 1-aminoethyl piperazine in amounts such that there is one equivalent of amine for each equivalent of acylating agent employed in the initial preparation of the ester-containing composition.

EXAMPLE 15

(a) Polyisobutylene having an average molecular weight of 2500 is reacted with maleic anhydride in a molar ratio of about 1:2 in the presence of chlorine gas according to the procedure described in U.S. Pat. 3,215,707 or 3,231,587 to produce a polyisobutylene material containing an average of two succinic acid anhydride groups per molecule.

This acylating agent is then reacted with the polyoxyalkylene triol of Example 1(a) and mannitol according to the general procedure set forth in Example 11(a) in an equivalent ratio of about 1:0.05:1.5 to produce an ester-containing composition of the type contemplated by this invention.

EXAMPLE 16

A tricarboxylic acid is prepared by reacting brominated poly(1-hexene) having an average molecular weight of about 2000 and a bromine content of 4% by weight with 2-pentene-1,3,5-tricarboxylic acid at about 150° C. for 20 hours. Then following the general procedure of Example 10(a), three equivalents of this acid is simultaneously reacted with one equivalent of propylene glycol, 1.5 equivalents of tris-($\beta$-hydroxyethyl)amine, and 0.075 equivalent of a polyoxyalkylene alcohol prepared under conventional oxyalkylation procedures through the reaction of dinonylphenol with propylene oxide and subsequently with ethylene oxide to produce a monoalkylphenyl ether of a polyoxyalkylene alcohol having an average molecular weight of about 5000 where —$CH_2CH_2O$— groups comprise about 12%–15% of their average molecular weight.

EXAMPLE 17

Following the general procedure of Examples 11(a) and (b), another ester-containing composition is prepared by replacing the polyoxyalkylene triol demulsifier employed there with an equivalent amount of another polyoxyalkylene triol demulsifier having an average molecular weight of about 2000 prepared by reacting under routine oxyalkylation conditions, glycerol with propylene oxide to form a hydrophobic base and then reacting this base with ethylene oxide in amounts such that

—$CH_2CH_2O$— units comprise about 9%–12% by weight of the average molecular weight.

EXAMPLE 18

(a) A polyoxyalkylene tetrol demulsifier is prepared by reacting under routine oxyalkylation conditions N,N,N',N' - tetrakis($\beta$ - hydroxypropyl)ethylenediamine with propylene oxide and then with ethylene oxide to produce a material having an average molecular weight of about 5400, about 11% of which is attributable to

—$CH_2CH_2O$— units.

As used in the present specification and claims, the language routine or conventional oxyalkylation procedures refers to the general procedures used by those skilled in the art to react alkylene oxides with materials having reactive hydrogens such as phenols, alcohols, amines, etc. These conditions usually involve contacting the alkylene oxide with the other reactive material, usually in the presence of an inert diluent, such as those described hereinbefore, in the desired mole ratio at a temperature of about 50°–200° C., usually about 100°–150° C. Superatmospheric pressure, e.g., ten to thirty p.s.i. are advantageously employed. Oxyalkylation are well known and need no detailed discussion here; see, for example U.S. Pats. 3,251,664, 2,792,369, and 2,792,371 and patents cited therein for a detailed discussion of such procedures.

(b) The acylating agent as described in Example 15(a) is simultaneously reacted with the tetrol of (a), pentaerythritol, and TMP in an equivalent ratio of 1:0.004:0.5:0:5 following the general procedure of Example 10(a).

EXAMPLE 19

(a) Three thousand parts (5.5 equivalents) of a polyisobutenyl-substituted succinic acid anhydride as described in Example 3(a), 330 parts (8 equivalents) of a polyethylene polyamine mixture having an equivalent weight of about 41.2 and 93 parts of the polyoxyalkylene polyol of Example 4 are reacted by adding the anhydride to a mixture of the amine and polyol preheated to about 130° C. and thereafter heating the resulting mixture to about 210° C. for about four hours while blowing with nitrogen. Then 2121 parts of mineral diluent oil are added and the mass is filtered at a temperature of about 150° C. The filtrate is an oil solution of the desired product.

(b) The general procedure of (a) is followed using 3000 parts of the anhydride, 163 parts (4 equivalents) of the amine, and 93 parts of the polyoxyalkylene polyol. After addition of 2010 parts of mineral diluent oil, the reaction mixture is filtered. The filtrate is a 45% oil solution of the desired product.

EXAMPLE 20

(a) A mixture comprising 1000 parts of the polyisobutenyl-substituted succinic acid anhydride of Example 3(a), 121 parts of pentaerythritol, 31 parts of the polyoxyalkylene polyol of Example 4, and 10 parts imidazole (catalyst) is heated at about 200°–220° C. with nitrogen blowing for about 5.5 hours. Then 937 parts of mineral diluent oil is added while maintaining nitrogen blowing. The resulting mixture is filtered at 110°–120° C., the filtrate being a 45% oil solution of the desired ester-containing composition.

(b) Following the general procedure of (a) the same reactants (same quantities also) are heated at 200°–215° C. for ten hours using one part imidazole catalyst.

EXAMPLE 21

(a) The general procedure of Example 11(a) was repeated substituting a Tetronic polyol having an average molecular weight of about 7900 for the polyoxyalkylene diol of that example in amounts such that the equivalent ratio of acylating agent:pentaerythritol:Tetronic 1501 is about 1:2:0.009. The resulting reaction mixture is then treated with the alkylene polyamine mixture of 11(b) following the general procedure of that example using sufficient polyamine to provide an equivalent ratio of acylating agent to polyamine of about 1:0.26 based on the total amount of acylating agent employed. A 45% oil solution of the desired product characterized by a nitrogen content of 0.33%.

(b) The general procedure of Example 21(a) is repeated but the amount of Tetronic polyol is increased to an amount sufficient to provide 0.018 equivalents. The final filtrate is a 45% oil solution of the desired product characterized by a nitrogen content of about 0.32%.

Other ester-containing compositions of the type contemplated by this invention are readily prepared by substituting other acylating agents, polyoxyalkylene alcohol demulsifiers, polyhydric alcohols, amines, and basically reacting Group IIa metal compounds as described above for all or a portion of the corresponding reactant utilized in the foregoing illustrating examples.

The ester-containing compositions of this invention normally will be employed in mineral lubricating oil base lubricant compositions. However, other lubricating oils, natural and synthetic, of lubricating viscosity can be used as the base oil. The ester-containing compositions should be employed in amounts such that the polyoxyalkylene alcohol moiety of the esters will constitute at least the percentage of the finished lubricant composition specified above. Clearly, the amount necessary to provide the indicated amount of demulsifier additive will depend on the specific ester-containing composition employed, the other additives, if any, present, etc. Generally the ester-containing compositions will be employed in amounts constituting about 0.1% to about 20% or more by weight of the finished lubricant, more often, about 1%–10% by weight.

Natural oils include animal oils and vegetable oils (e.g., castor oil, lard oil) as well as solvent-refined or acid-refined mineral lubricating oils of the paraffinic, naphthenic, or mixed paraffinic-naphthenic types. Oils of lubricating viscosity derived from coal or shale are also useful base oils. Synthetic lubricating oils include hydrocarbon oils and halo-substituted hydrocarbon oils such as polymerized and interpolymerized olefins (e.g., polybutylenes, propylene-isobutylene copolymers, chlorinated polybutylenes, etc.); alkyl benzenes (e.g., dodecylbenzenes, tetradecylbenzenes, dinonylbenzenes, di-(2-ethylhexyl)benzenes, etc.); polyphenyls (e.g., bi-phenyls, terphenyls, etc.); and the like. Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$–$C_8$ fatty acid esters, or the $C_{13}$ Oxo acid diester of tetraethylene glycol. Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethyl-hexanoic acid, and the like. Silicon-based oils such as the polyalkyl-, polyaryl-, polyalkoxy-, or polyarylsiloxane oils and silicate oils comprise another useful class of synthetic lubricants (e.g., tetraethyl-silicate, tetraisopropyl-silicate, tetra-(2-ethylhexyl)-silicate, tetra-(4-methyl-2-tetraethyl)-silicate, tetra-(p-tert - butylphenyl)-silicate, hexyl-(4-methyl-2-pentoxy)- disiloxane, poly(methyl)-siloxanes, poly(methylphenyl) - siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans, and the like.

As mentioned supra, the present invention contemplates the presence of other additives in the lubricating compositions in addition to the ester-containing compositions described above. Such additives include, for example, ashless dispersants, detergents of the ash-containing type, viscosity index improving agents, pour point depressants, anti-foam agents, extreme pressure agents, rust inhibitors, oxidation and corrosion inhibitors, and the like. These other additives can be employed in the amounts they are normally employed in lubricant compositions.

The ash-containing detergents are exemplified by oil-soluble neutral and basic salts of alkali or alkaline earth metals with sulfonic acids, carboxylic acids or organic phosphorous acids characterized by at least one direct carbon-to-phosphorous linkage such as those prepared by the treatment of an olefin polymer (e.g., polyisobutene having a molecular weight of 1000) with a phosphorizing agent such as phosphorous trichloride, phosphorous heptasulfide, phosphorous pentasulfide, phosphorous trichloride and sulfur, white phosphorous and a sulfur halide, or phosphorothioate chloride. The most commonly used salts of such acids are those of sodium, potassium lithium, calcium, magnesium, strontium and barium.

The term "basic salt" is used to designate the metal salts wherein the metal is present in stoichiometrically larger amounts than the organic acid radicals. The commonly employed methods for preparing the basic salts involves heating a mineral oil solution of an acid with a stoichiometric excess of a metal neutralizing agent such as a metal oxide, hydroxide, carbonate, bicarbonate, or sulfide at a temperature above about 50° C. and filtering the resulting mass. The use of a "promoter" in the neutralization step to aid in the incorporation of a large excess of metal likewise is known. Examples of compounds useful as the promoter include phenolic substances such as phenol, naphthol, alkylphenols, thiophenols, sulfurized alkylphenols, condensation products or formaldehyde with such phenolic substances, alcohols such as methanol, 2-propanol, octyl alcohol, Cellosolve, Carbitol, ethylene glycol, cyclohexyl alcohol; amines such as aniline, phenylene diamine, phenothiazine, phenyl-beta-naphthylamine, and dodecylamine. A particularly effective method for preparing the basic salts comprises mixing an acid with an excess of a basic alkaline earth metal neutralizing agent, a phenolic promoter compound, and a small amount of water, and carbonating the mixture at an elevated temperature such as 60° to 200° C.

Extreme pressure agents and corrosion-inhibiting and oxidation-inhibiting agents are exemplified by chlorinated aliphatic hydrocarbons such as chlorinated wax; organic sulfides and polysulfides such as benzyldisulfide, bis-(chlorobenzyl)-disulfide, dibutyl tetrasulfide, sulfurized sperm oil, sulfurized methyl ester of oleic acid, sulfurized alkylphenol, sulfurized dipentene, and sulfurized terpene; phos- phosulfurized hydrocarbons such as the reaction product of phosphorus sulfide with turpentine or methyloleate; phosphorous esters including principally dihydrocarbon and tri-hydrocarbon phosphites such as dibutylphosphite, diheptyl phosphite, dicyclohexyl phosphite, pentylphenyl phosphite, dipentyl phenyl phosphite, tridecyl phosphite, distearyl phosphite, dimethyl naphthyl phosphite, oleyl 4-pentyl phenyl phosphite, polypropylene-(molecular weight 500)-substituted phenyl phosphite, diisobutyl-substituted phenyl phosphite; metal thiocarbamates such as zinc dioctyldithiocarbamate and barium heptylphenyl dithiocarbamate; Group II metal phosphorodithioates such as zinc dicyclohexyl phosphorodithioate, zinc dioctyl phosphorodithioate, barium di(heptylphenyl)-phosphorodithioate, cadmium dinonyl phosphorodithioate, and a zinc salt of a phosphorodithioic acid produced by the reaction of phosphorus pentasulfide with an equal molar mixture of isopropyl alcohol and n-hexyl alcohol.

When employed as fuel additives, the base fuel will generally be a normally liquid petroleum distillate fuel such as diesel fuel, aviation fuel, gasoline, kerosene, fuel oil and the like. Usually, the dispersancy, aqueous emulsion, and rust problems in fuels is not as great as in lubricant compositions. Thus, while those amounts of ester-containing compositions which will furnish the previously indicated concentrations of demulsifier moiety in the final fuel composition are useful, there usually will not be any need to exceed that amount of ester-containing composition necessary to provide about 0.1%, more often, 0.05% by weight demulsifier moiety in the final fuel. Again, the amount of ester-containing composition employed in a specific fuel will depend on the particular fuel and the amounts and kinds of other additives present in the fuel.

Other conventional fuel additives such as smoke suppressants (for example, the ash-containing detergents described above, particularly overbased barium detergents) ashless dispersants, anti-icing agents, anti-stallings agents, lead scavengers, lead alkyl antiknock additives, dyes, corrosion inhibitors, lead octane appreciators, etc., such as tetraethyl lead, tetramethyl lead, dimethyldiethyl lead, tetravinyl lead, t-butyl acetate, tri-($\beta$-chloroethyl)-phosphate, isopropanol, and the like.

The following are illustrative of the lubricants and fuel compositions of this invention.

COMPOSITION A

SAE 10W–40 mineral lubricating oil containing 0.5% of the filtrate of Example 1(b).

COMPOSITION B

SAE 50 mineral lubricating oil containing 3.5% of the filtrate of Example 3(b), 1.5% of an acylated nitrogen composition prepared by reacting in about a 1:1 equivalent ratio at about 150° C. polyisobutenyl (M.W.—1100)-substituted succinic anhydride with a commercial polyethylene polyamine mixture having an average composition corresponding to that of tetraethylene pentamine, and 0.06% of phosphorus as the zinc salt of di-n-octylphosphorodithioate.

COMPOSITION C

SAE 10W–30 mineral lubricating oil containing 5% of the filtrate of Example 9(b), 0.075% of phosphorus as the zinc salt of a mixture of equimolar amounts of diisopropyl phosphorodithioic acid and di-n-decylphosphorodithioic acid, and 2.0% sulfate ash as a basic barium detergent prepared by carbonating at 150° C. a mixture comprising mineral oil, one mole of barium didecylbenzene sulfonate, and 1.5 moles of barium hydroxide in the presence of 0.7 mole of octylphenol as the promoter.

COMPOSITION D

SAE 10 mineral lubricating oil containing 6.5% of the filtrate of Example 11(b), 0.06% phosphorus as the adduct of one mole of zinc dicyclohexylphosphorodithioate and 0.3 mole of ethylene oxide, 2% of sulfurized sperm oil having a sulfur content of 10%, 3% of a poly-(alkylmethacrylate) viscosity index improver, and 0.003% of a poly(alkylsiloxane) antifoam agent.

COMPOSITION E

SAE 20 mineral lubricating oil containing 0.5% of the composition of 17(b), 2.5% of the filtrate of Example 15(a), 0.08% of phosphorus as the zinc salt of a phosphorodithioic acid prepared by the reaction of phosphorus pentasulfide with an equimolar mixture of n-butyl alcohol and dodecyl alcohol, 2.5% of a basic barium detergent prepared by carbonating a mineral oil solution containing one mole of sperm oil, 0.6 mole of octylphenol, two moles of barium oxide, and a small amount of water at 150° C.

COMPOSITION F

A synthetic lubricating oil consisting essentially of the diethylether of polypropylene glycol having an average molecular weight of about 1500 containing 0.75% of the filtrate of Example 15(a).

COMPOSITION G

Gasoline containing 0.001% of the filtrate of Example 7.

COMPOSITION H

Diesel fuel containing 0.025% of the filtrate of Example 12.

COMPOSITION I

Kerosene-containing 0.07% of the filtrate of Example 11(b).

COMPOSITION J

Gasoline containing 0.001% of the filtrate of Example 9(b).

The improvement in rust resistance demonstrated by the ester-containing compositions of this invention is illustrated by the results obtained in the Puia Falcon engine test as shown in Table I. A rating of 10 indicates no rust.

TABLE I.—RUST RATINGS

| Composition | Overall engine rust | Average lifter rust | Average crankshaft rust |
|---|---|---|---|
| AA | 6.8 | 6.5 | 6.9 |
| BB | 9.7 | 9.8 | 9.8 |
| CC | 9.5 | 9.5 | 9.5 |
| DD | 9.4 | 9.5 | 9.5 |

Compositions AA and BB are the same except for the evaluated additive. AA contains about 3.14% of a filtrate containing about 45% mineral diluent oil and produced according to the general procedure of Example 11(a) except the polyoxyalkylene polyol demulsifier reactant is omitted. BB contains about 3.4% of a filtrate containing about 45% diluent mineral oil produced according to the general procedure of Examples 11(a) and (b) by reacting 1750 parts of the acylating agent with 211.5 parts of pentaerythritol and 54.5 parts of the polyoxyalkylene polyol and contacting that reaction mixture with 34 parts of the ethylene polyamine mixture. The lubricating compositions of CC and DD are the same except that the former contains about 4.5% of the filtrate produced according to Example 11(b) and the latter contains the same amount of the filtrate of Example 9(b).

The excellent emulsion sludge-resisting characteristics of the ester-containing compositions of this invention is shown by the Falcon engine test results presented in Table II. This test utilizes a Ford Falcon six cylinder engine operating on a cycling procedure consisting of 45 minutes at idle 500 r.p.m., no load, followed by 120 minutes at 2500 r.p.m., 31 BHP. The engine is modified by providing for water cooling of the rocker arm cover in order to maintain a cover temperature of about 105°–115° F. During the cycle, the blow-by is passed through a condenser and the condensate is returned to the crankcase. The cycle is repeated five times in succession each day (for 13¾ hours of engine operation), and then the engine is shut down for the remainder of the day (for 10¼ hours). This completes a day's running.

The test is run on a consecutive day-to-day basis. Daily test evaluation consists of rating the rocker arm cover for emulsion deposits on a numerical scale of 1 to 10 where 10 represents maximum cleanliness, i.e., freedom from aqueous emulsion deposits. The rocker arm cover is removed and inspected after each 13¾ hours of operation and the cover then immediately replaced.

TABLE II.—EMULSION RATINGS

| Composition | Rating on indicated test day | | | | | | | |
|---|---|---|---|---|---|---|---|---|
| | 1st | 2nd | 3rd | 4th | 5th | 6th | 7th | 8th |
| EE | 4.5 | 3.5 | | | | | | |
| FF | 7.5 | 7 | 7.5 | 7 | 6.5 | 4.5 | | |
| GG | 7.5 | 7.5 | 8 | 7.5 | 7 | 6.5 | 5 | 4 |

Each of the lubricating compositions was the same except for the dispersant and each contained 4.35% of a 45% oil solution of the evaluated dispersant. Composition EE contained the same dispersant as Composition AA while Composition FF and GG contained a 45% oil solution of the ester-containing compositions of Examples 9(b) and 11(b), respectively.

The improvement in dispersancy characteristics is shown by the varnish ratings achieved in the Ford Sequence VB test results present in Table III. The lubricating compositions each contained 4% of a 45% oil solution of the evaluated dispersant but were otherwise the same.

TABLE III.—VARNISH RATINGS

| Composition | Overall engine varnish [1] | Piston varnish [2] |
|---|---|---|
| HH | 34.6 | 6.7 |
| II | 41.8 | 9.1 |
| JJ | 45.1 | 8.7 |

[1] Rating scale of 0 to 50, 50 being best rating.
[2] Rating scale of 0 to 10, 10 being best rating.

The dispersant of HH is the same as that described for Composition AA and the dispersants employed in II and JJ are the ester-containing filtrates of Examples 9(b) and 11(b) respectively.

From the foregoing, it is clear that the ester-containing compositions of this invention are all useful as dispersants in lubricants and fuels and that in addition to their dispersancy capabilities, they are characterized by improved emulsion and rust properties.

Of course, the description of the invention as presented hereinbefore is concerned with the preparation of dispersants which will perform satisfactorily under conditions where emulsion sludge would otherwise be a problem. Thus, if the dispersants described herein are to be employed in an environment where emulsion sludge is not a problem, excellent dispersants can be prepared for that environment simply by eliminating the reaction of the high molecular weight carboxylic acid acylating agent with the polyoxyalkylene alcohol demulsifiers. For example in the above illustrative examples, e.g., Examples 2, 5, 7, 8, 9, 10, 11, 12, 13, 14, 15, 19, and 21, elimination of the poloxyalkylene alcohol demulsifier reactants produces dispersants having excellent sludge-dispersing capabilities.

What is claimed is:

1. A lubricant or fuel compositions comprising a major amount of a lubricating oil or a normally liquid fuel and a minor amount of at least one detergent additive sufficient to improve the demulsification properties of the composition, said additive comprising the oil-soluble reaction product prepared by the reaction of
   (A) at least one substantially saturated aliphatic hydrocarbon carboxylic acid acylating agent having an average of at least thirty aliphatic carbon atoms per molecule exclusive of the carboxylic carbon atom and being substantially free from oil-solubilizing pendant groups; with
   (B) at least one polyoxyalkylene alcohol which is a demulsifier for aqueous emulsion, has an average molecular weight in the range of from about 1,000 to about 10,000, and is a block polymer comprising (1) a hydrophobic portion corresponding to the formula, $-CH(R')-CH_2-O-$, wherein R' is an alkyl group of up to three carbon atoms, and (2) from about 5% to about 40% by weight of a hydrophilic portion corresponding to the formula,
$$-CH_2-CH_2-O-;$$
   and
   (C) at least one primary or secondary amine;

wherein the total amount of (A), (B), and (C) used in the reaction is such that there is at least 0.001 equivalent of (B), and at least 0.01 equivalent of (C) per equivalent of (A).

2. The lubricant or fuel composition of claim 1 wherein the polyoxyalkylene alcohol has an average molecular weight in the range of from about 2,000 to about 7,000 has from two to four hydroxy groups and the hydrophilic content is from about 10% to about 30% by weight.

3. The lubricant or fuel composition of claim 2, wherein the total amount of (B) and (C) is such that there is at least about 0.5 equivalent of the combination of (B) and (C) for each equivalent of (A).

4. The lubricant or fuel composition of claim 3, wherein the amine component (C) is an alkylene polyamine having two to three carbon atoms and three to seven amino nitrogens.

5. The lubricant or fuel composition of claim 4, wherein the carboxylic acylating agent was prepared by the reaction of an alpha, beta-ethylenically unsaturated carboxylic acid or anhydride selected from the group consisting of acrylic, methacrylic, and maleic, with an ethylenically unsaturated hydrocarbon or halogenated hydrocarbon having an average of at least fifty carbon atoms.

6. The lubricant or fuel composition of claim 5, wherein the ethylenically unsaturated hydrocarbon or halogenated hydrocarbon is a 1-olefin polymer or a chlorinated 1-olefin polymer.

7. The lubricant or fuel composition of claim 6, wherein the 1-olefin polymer or chlorinated 1-olefin polymer is a polybutylene or chlorinated polybutylene.

8. The lubricant or fuel composition of claim 1, wherein the acylating agent is a substantially saturated aliphatic hydrocarbon substituted succinic acid or anhydride, wherein the substituents are derived from the group consisting of ethylene-propylene copolymer, polypropylene, polybutylene, chlorinated ethylene-propylene copolymer, chlorinated polypropylene and chlorinated polybutylene.

9. The lubricant or fuel composition of claim 1, wherein (A) is reacted with (B) and (C) simultaneously.

10. The lubricant or fuel composition of claim 1, wherein the weight percentage of the esterified polyoxyalkylene alcohol moiety in the ester additive is in the range of from about 0.00005% to about 5% by weight of the total weight of the composition.

11. The lubricant or fuel composition of claim 1, wherein the ratio of equivalents of (A) to (B) to (C) is represented by the ratio of $1:b:c$, where $b \geq 0.001$, $c \geq 0.2$, and $b+c \geq 0.5$.

12. A lubricant or fuel composition comprising a major amount of a lubricating oil or a normally liquid fuel and a minor amount of at least one detergent additive sufficient to improve the demulsification properties of the composition, said additive comprising the oil-soluble reaction product prepared by the reaction of
   (A) at least one substantially saturated aliphatic hydrocarbon substituted succinic acid or anhydride wherein the substituents are derived from a 1-olefin polymer or a halogenated 1-olefin polymer, and have an average molecular weight in the range of from about 700 to about 5,000; with
   (B) at least one polyoxyalkylene alcohol which is a demulsifier for aqueous emulsions, has an average molecular weight in the range of from about 1,000 to about 10,000, and is a block polymer comprising (1) a hydrophobic portion corresponding to the formula, —CH(R')—CH$_2$—O—, wherein R' is an alkyl group of up to two carbon atoms and (2) from about 5% to about 40% by weight of a hydrophilic portion corresponding to the formula,

—CH$_2$—CH$_2$—O—;

and (C) at least one alkylene polyamine having two to three carbon atoms in the alkylene group and three to seven amino nitrogens;

wherein the total amount of (A), (B), and (C) used in the reaction is such that there is at least 0.001 equivalent of (B), and at least 0.01 equivalent of (C) per equivalent of (A).

13. The lubricant or fuel composition of claim 12, wherein the alkylene polyamine is a polyethylene polyamine or mixtures thereof.

14. The lubricant or fuel composition of claim 12, wherein the polyoxyalkylene alcohol has an average molecular weight in the range of from about 2,000 to about 7,000, has from two to four hydroxy groups, and the hydrophilic content is in the range of from about 10% to about 30% by weight.

15. The lubricant or fuel composition of claim 12, wherein the 1-olefin polymer or chlorinated 1-olefin polymer is a polybutylene or chlorinated polybutylene.

16. The lubricant or fuel composition of claim 12, wherein (A) is reacted with (B) and (C) simultaneously.

References Cited

UNITED STATES PATENTS

| 3,509,052 | 4/1970 | Murphy | 252—34.7 |
| 3,522,179 | 7/1970 | Le Suer | 252—51.5 A |
| 3,525,693 | 8/1970 | Lyle et al. | 252—34 |
| 3,057,892 | 10/1962 | De Groote | 260—407 |
| 3,184,474 | 5/1965 | Catto et al. | 260—326.3 |
| 2,552,532 | 5/1951 | De Groote | 252—331 |
| 2,562,878 | 8/1951 | Blair | 252—340 |
| 2,568,746 | 9/1951 | Kirkpatrick et al. | 252—340 |

WARREN H. CANNON, Primary Examiner

U.S. Cl. X.R.

44—71; 252—34, 39, 40.5

UNITED STATES PATENT OFFICE
CERTIFICATE OF CORRECTION

PATENT NO. : 3,836,471
DATED : September 17, 1974
INVENTOR(S) : Clark Ober Miller It is certified that error appears in the above-identified patent and that said Letters Patent are hereby corrected as shown below:

Claim 4, line 24, the term "atoms" should read -- atoms in the alkylene groups--

Column 27, line 8, the term "group" should read --groups--

Signed and Sealed this sixth Day of April 1976

[SEAL]

Attest:

RUTH C. MASON
*Attesting Officer*

C. MARSHALL DANN
*Commissioner of Patents and Trademarks*